United States Patent [19]

Maloney

[11] Patent Number: 5,173,821

[45] Date of Patent: Dec. 22, 1992

[54] ADAPTIVE-GAP MAGNETIC RECORDING AND READING HEAD

[75] Inventor: William T. Maloney, Sudbury, Mass.

[73] Assignee: Unisys Corporation, Blue Bell, Pa.

[21] Appl. No.: 670,643

[22] Filed: Mar. 18, 1991

[51] Int. Cl.⁵ .............................................. G11B 5/23
[52] U.S. Cl. .................................... 360/119; 360/122
[58] Field of Search ....................... 360/119, 121, 122

[56] References Cited

U.S. PATENT DOCUMENTS

| 4,821,126 | 4/1989 | Matsumoto | 360/119 |
| 4,849,841 | 7/1989 | Sokolik | 360/119 |
| 5,012,375 | 4/1991 | Nishimura | 360/119 |

Primary Examiner—David J. Severin
Attorney, Agent, or Firm—Albert B. Cooper; Mark T. Starr

[57] ABSTRACT

A ring-type magnetic recording and reading head having a saturable pole tip that defines a narrow gap for reading and saturates in response to normal write current so as to define a wide gap for recording.

7 Claims, 3 Drawing Sheets

ADAPTIVE-GAP MAGNETIC RECORDING AND READING HEAD

BACKGROUND OF THE INVENTION

1. Field of the Invention

The invention relates to recording and reading digital data on a moving magnetic medium particularly with respect to a ring-type magnetic head therefor.

2. Description of the Prior Art

Ring-type heads are ubiquiously utilized in the moving magnetic medium storage technology for recording and reading information in both the longitudinal mode and in the perpendicular mode. Although achieving high density recording on the magnetic surfaces is desirable, such high density recording results in a compromise in the optimum gap length of the ring head. Reading back information which has been recorded at high linear densities, for example, in excess of 50,000 flux changes per inch, requires a very short gap in the ring head. Ring heads, however, having adequately short gaps for reading at high densities are unable to adequately overwrite previously recorded information. In order to read such high density recorded information, gap lengths on the order of ten microinches are required. Such a gap length is not fully effective in properly recording or overwriting in either the longitudinal mode on, for example, a longitudinal thin-film medium or in the perpendicular mode on the somewhat thicker perpendicularly oriented magnetic medium.

One solution to the problem is the utilization of two heads, one for reading and the other for writing. The read head utilizes a short gap and the write head a longer gap which may be approximately two to four times longer than the reading gap. The utilization of two heads undesirably increases the system cost, complexity and space requirements. The ring-type head is particularly adaptable to the conventional Winchester-type arrangement where the head assembly flies aerodynamically over a magnetic disk.

In a somewhat unrelated context, U.S. Pat. No. 4,317,148, issued Feb. 23, 1982 to Chao S. Chi, discloses a transducer particularly adapted for perpendicular magnetic recording. The transducer of said U.S. Pat. No. 4,317,148 utilizes a sub-core with an auxiliary winding for controllably providing a ring-type gap for reading and single pole performance for recording. The construction of the transducer of said U.S. Pat. No. 4,317,148 is relatively complex and expensive, requires auxiliary windings and additional electrical excitation and control.

SUMMARY OF THE INVENTION

The present invention obviates the disadvantages of the prior art by a ring-type magnetic recording and reading head having a low reluctance path closed through a high reluctance gap defined by two poles in said low reluctance path. A high permeability member forms a portion of said low reluctance path. An electrical winding on the high permeability member is adapted for receiving write current for imposing flux across the gap and for manifesting read current caused by flux changes sensed at the gap. A saturable pole tip on one of the poles, in part, defines the gap and is saturated in response to write current applied to the electrical winding. The saturable pole tip effectively forms a wide gap when the head is operating as a recording head and a narrow gap when the head is operating as a reading head.

DESCRIPTION OF THE PREFERRED EMBODIMENTS

Figure 1:
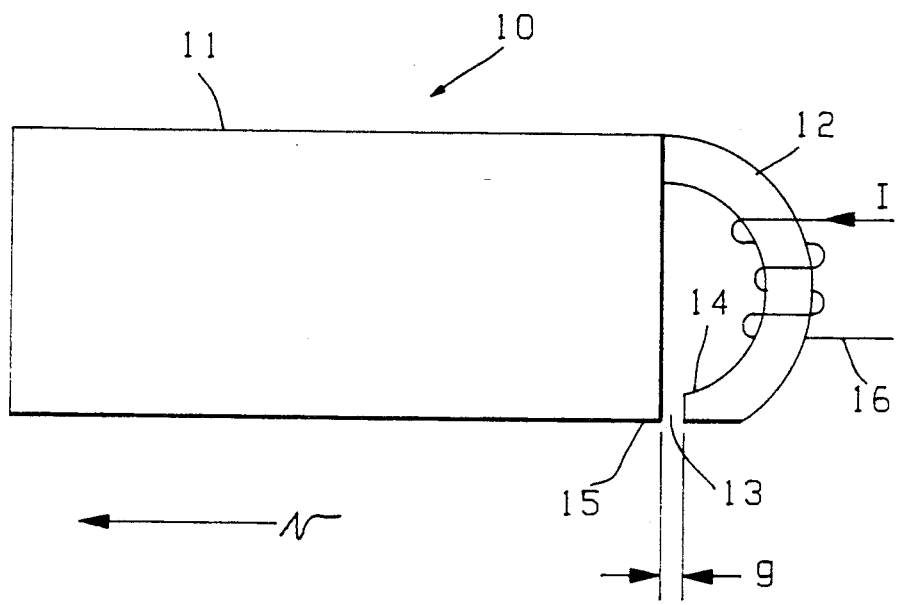
FIG. 1 is a side elevation view of a conventional Winchester-type ring head.

Referring to FIG. 1, a conventional magnetic record/read head assembly 10 is schematically illustrated. The head assembly 10 may, for example, be configured as a Winchester-type assembly implemented in ferrite. A slider 11 is conventionally shaped so that the head assembly 10 flies aerodynamically over the moving surface of, for example, a magnetic disk. The relative velocity of the head assembly 10 with respect to the magnetic medium on the surface of the disk is illustrated by an arrow v. A "C" shaped core member 12 completes a magnetic circuit through the slider 11 across a high reluctance gap 13. The gap 13 has a length g as illustrated.

The gap 13 is defined by two magnetic poles 14 and 15, which form part of the core 12 and slider 11, respectively. In the embodiment illustrated, the edge of the pole 15 defines the leading edge of the gap 13 and the edge of the pole 14 defines the trailing edge thereof. The core 12 supports a coil 16 which is utilized to energize the head assembly 10 with a write current I on writing and which picks up the magnetic transitions recorded on the medium to generate a play-back signal on reading. The flux fringing from the recording gap 13 effects the magnetization of the disk on writing. The same gap 13 functions as an "antenna" for detecting the fringing field from flux transitions written on the disk for reading. The application of the technology represented by the head assembly 10 to high linear recording densities requires g to be reduced to lengths on the order of 10 microinches, which length renders the head assembly ineffective in recording or overwriting old information with respect to either longitudinal thin-film media or the somewhat thicker perpendicular media.

Figure 2:
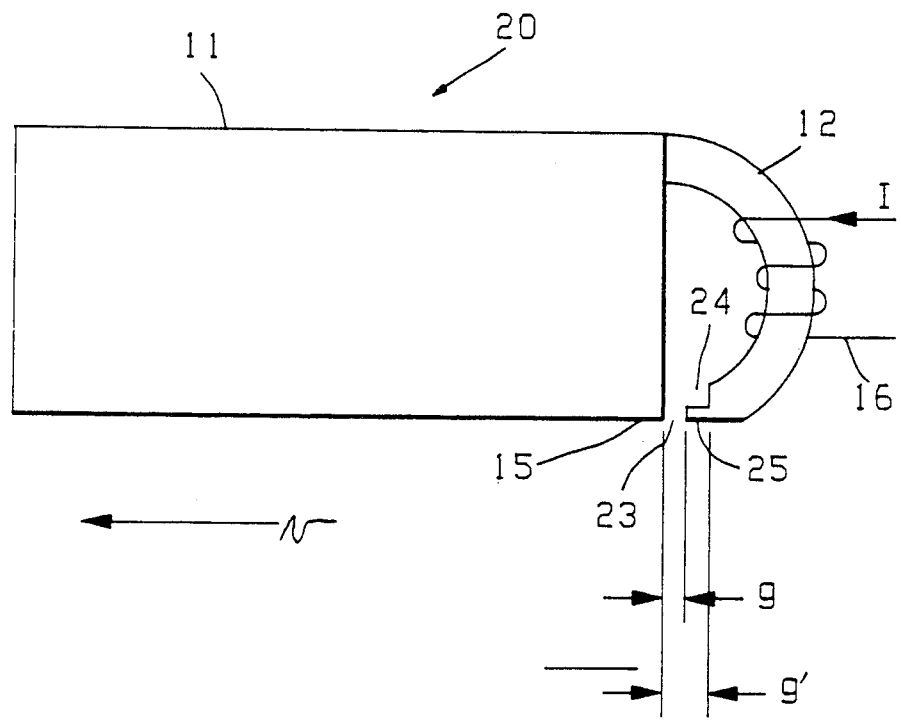
FIG. 2 is a side elevation view of an adaptive-gap head configured in accordance with the present invention.
Figure 2A:
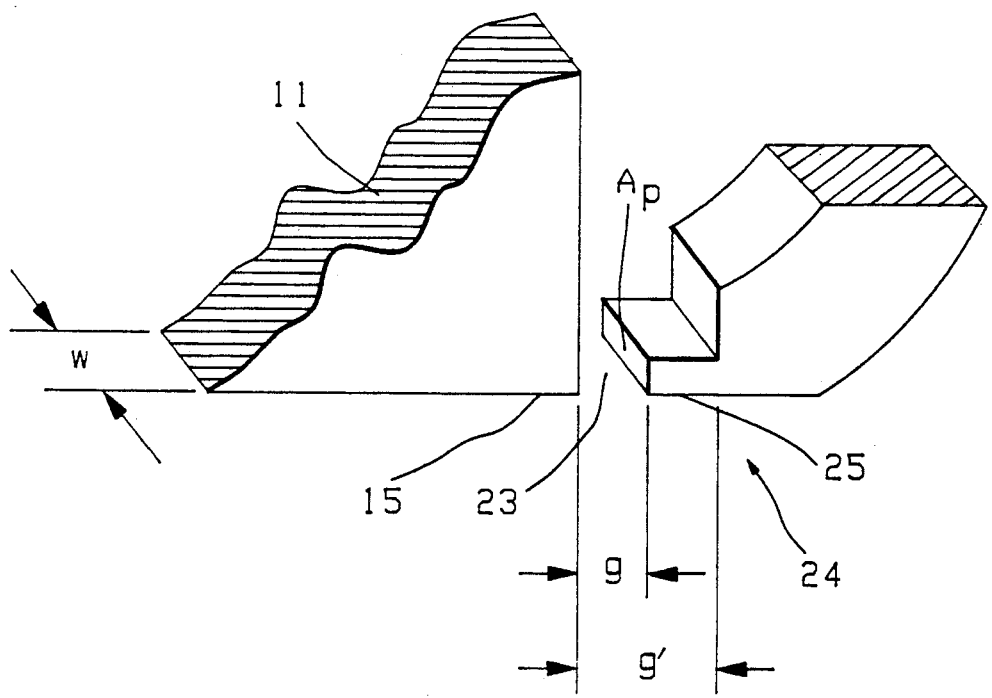
FIG. 2A is an enlarged three-dimensional view of the gap area of the head of FIG. 2.

Referring to FIGS. 2 and 2A, in which like reference numerals indicate like elements with respect to FIG. 1, an adaptive-gap head assembly 20 having an adaptive gap 23 is illustrated. The trailing pole 14 of FIG. 1 is replaced by a stepped pole 24 effectively providing two gap lengths g and g'. The pole 24 has a saturable pole tip 25. FIG. 2A illustrates an enlarged view of the poles 15 and 24 with the adaptive gap 23 therebetween. It is appreciated from FIG. 2A, that the head assembly 20 has a thickness w.

When the head assembly 20 is operating in a reading mode, the gap length g is effective. Magnetic flux levels in the core 12 are very low and the head assembly 20 operates in a region denoted as "linear". In such "linear" operation, the magnetic flux threading the coil 16 varies linearly with respect to the field fringing from recorded transitions. The tip 25 of the magnetic pole 24 has a cross-sectional area $A_p$ adequate to contain the flux picked up from the recorded transitions without the tip 25 becoming magnetically saturated.

During writing operations, however, high currents on the order of many tens or hundreds of milliamperes are imposed on the coil 16 resulting in magnetic flux levels in the head which would tend to exceed the saturation flux density level of the ferrite in regions where the cross-sectional area of the magnetic circuit is sufficiently small. Such a region is the pole tip 25 having the cross-sectional area $A_p$. As the area $A_p$ approaches saturation, no significant increase in flux density can be accommodated. Increases in current through the coil 16 beyond this level result in increasing amounts of magnetic flux fringing from the area of the trailing pole 24 facing the medium. As current is further increased, little change occurs in the pattern of fringing flux emerging from $A_p$. There is, however, superimposed upon this fringing flux, a further fringing flux pattern which emerges from the surface of the trailing pole 24 facing the medium. Although the flux pattern fringing from $A_p$ is insufficient, by itself, to overwrite the medium, the further flux pattern fringing from the pole face penetrates further into the medium at sufficiently high intensities so that the sum of the two patterns adequately overwrites the medium.

It is appreciated that the resolution obtained in the writing process described is a very weak function of the gap length. The resolution is determined almost solely by the steepness of the gradient of the field distribution at the trailing edge (pole 24) of the head field. Thus, the resolution for writing of the adaptive-gap head 20, is not adversely affected by the larger gap g'. With the configuration of FIG. 2, however, a shift occurs in the location where a transition is written from the location, with respect to the head, where it will be read. This is because writing takes place in the vicinity of the maximum field gradient and this region moves to the right in the arrangement illustrated in FIG. 2 since the "new" gap face has moved to the right. In other words, as the trailing pole 24 saturates, flux closes more and more to the right. The effect is a longer gap, although with an effective write position (steep gradient) that moves as the current increases. Thus, there is the possibility of a greater than desirable shift in the location where a transition is written from the location, with respect to the head, where it is read. The configuration of FIG. 3 resolves this problem.

Figure 3:
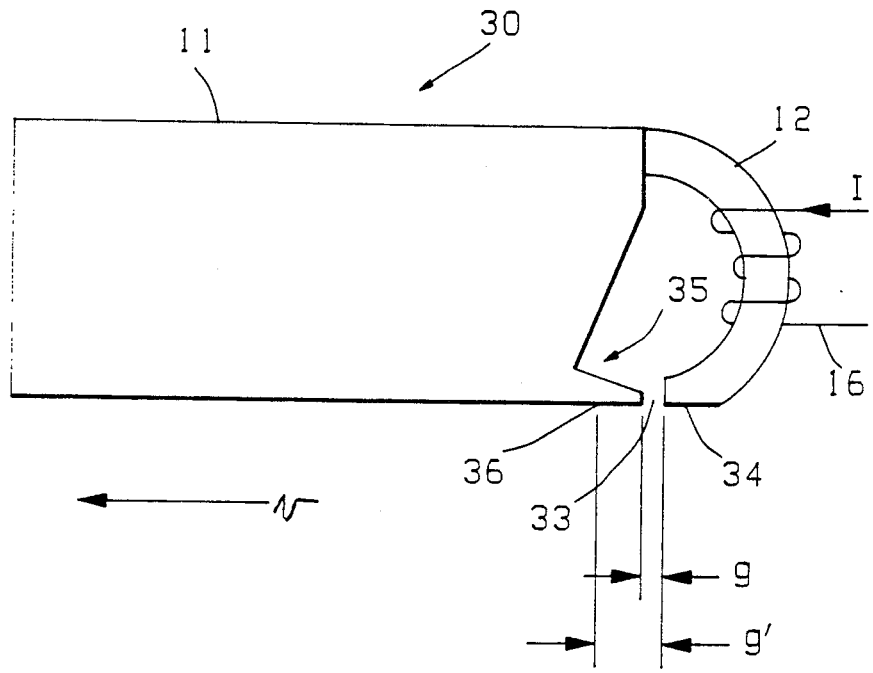
FIG. 3 is a side elevation view of a further embodiment of an adaptive-gap head configured in accordance with the present invention.
Figure 3A:
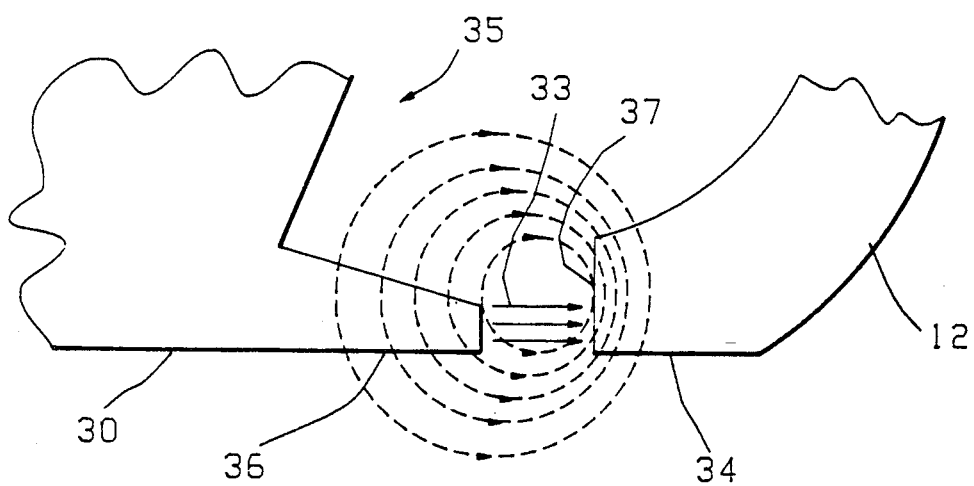
FIG. 3A is an enlarged view of the gap area of the head of FIG. 3.

Referring to FIGS. 3 and 3A, in which like reference numerals indicate like elements with respect to FIG. 1, a further embodiment of an adaptive-gap head assembly 30 is illustrated. FIG. 3A provides an enlarged view of the gap and poles of FIG. 3. The head assembly 30 has a gap 33 defined by a pole 34 and a graded pole 35. The pole 35 has a saturable pole tip 36 and the pole 34 has a trailing head gap face 37. Thus, the embodiment of FIG. 3 effects two modifications with respect to that of FIG. 2. Firstly, the stepped gap of FIG. 2 is replaced by the graded gap of FIG. 3. Secondly, the modified pole piece is located on the forward edge of the head gap, rather than on the trailing edge as in FIG. 2. FIG. 3A schematically illustrates the fringing fields between poles 34 and 35 across the gap 33. The solid field lines indicate the fringing field at low field levels, such as encountered during reading. The dashed field lines indicate the additional fringing field superimposed on the solid field lines at the higher field levels utilized during writing. The actual effective write field is the summation of these two components. The effective location of the trailing edge field is constrained to be near the trailing surface of the head gap 33 defined by the trailing pole 34 and the pole face 37.

The tapered forward pole 35 is a variation of the stepped pole 24 of FIG. 2. The flux lines diverge from the tapered pole tip 36 as far to the left along the tapered pole as necessary to accommodate the magnitude of the current applied to the coil 16. The indefiniteness of the actual point of emergence of this flux is of only secondary importance, since the trailing head field is localized to the trailing head gap face 37 by the significantly larger pole 34 utilized at the trailing gap edge. This localization may be further enhanced by coating the face 37 of the trailing pole 34 with a high-saturation material such as permalloy.

The tapered pole arrangement of FIG. 3 may result in less penetration of the flux into the medium as compared to the stepped pole arrangement of FIG. 2. It is appreciated that either the tapered or stepped pole may be utilized in the configurations of FIGS. 2 and 3 on either the leading or trailing edge of the gap. The choice of utilizing a tapered or stepped pole is determined by magnetic requirements and ease of manufacture.

Figure 4:
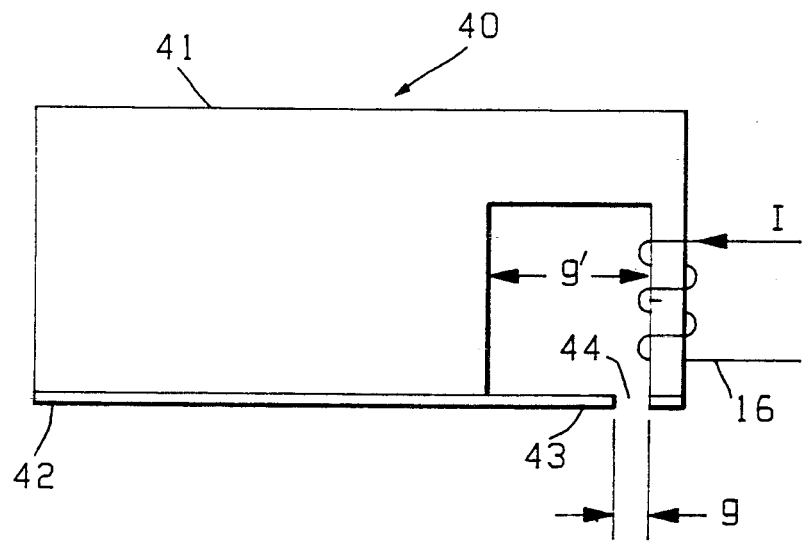
FIG. 4 is a side elevation view of a further embodiment of an adaptive-gap head configured in accordance with the present invention.

As discussed above, the head assemblies of FIGS. 2 and 3 may be constructed of ferrite material. The invention is also applicable to metallic heads or to composite heads composed of ferrite and metal. Such constructions are practical as long as eddy currents in the metallic parts do not slow the risetime of the head field beyond acceptable limits. Referring to FIG. 4, in which like reference numerals indicate like elements with respect to FIG. 1, an example of an adaptive-gap composite head assembly 40 is illustrated. Ferrite or other magnetic material forms body 41 of the head/slider assembly. After grinding and lapping the body 41, a thin film 42 of high-permeability metal is deposited on the bearing surfaces by a suitable thin-film deposition technique, such as sputtering. The thin film forms a long leg or pole tip 43 defining a small gap 44. The small gap 44 has a length g. When the leg 43 is saturated during writing, the gap 44 increases in size to a length g'. Film thickness is selected so that the film 42 saturates at flux-density levels below that required for effective writing. The film 42 remains in an unsaturated state during reading. Appropriate techniques such as photoresist technology are utilized to define the small gap 44. In a manner similar to that described above, when the head 40 is excited at high writing levels, the flux density in the long leg 43 attains the saturation level, and at still higher drive levels, flux begins to fringe from the larger gap defined by the length g'.

It is appreciated that adaptive-gap head assemblies implemented in accordance with the invention may be embodied by multi-layer deposition as is commonly utilized with present day thin-film heads. The head assemblies described above with respect to FIGS. 2-4, are suitable for recording on either longitudinal or perpendicular recording media in parallel or perpendicular recording modes, respectively. This is appreciated from the above figures and descriptions since the flux fringing across the gap in the writing mode has significant perpendicular, as well as longitudinal components. Thus, the present invention provides magnetic read/- write heads useful in high-density perpendicular or longitudinal magnetic recording. The invention provides a variable gap length head that is particularly easy to fabricate. The ring-type magnetic recording and reading head of the present invention utilizes a gap with an adaptive length that increases automatically during the writing process by saturation of one or two saturable pole tips. The head gap can thus be separately optimized for the read and write functions. The present invention provides a single head with a small gap for high reading resolution and a large gap for effective overwrite without the requirement for structures and electrical excitation in addition to the conventional read/write coil and the normal write current.

The present invention provides a magnetic recording and reading head having a short magnetic gap when the head is unenergized, such as in the read state, and a significantly longer effective gap when the head is driven in the write state This change in gap length is achieved by designing the head, as described above, so that the gap lengthens naturally when the high-level recording flux is applied No auxiliary windings or excitations are required for the operation The gap automatically adjusts to the optimum length required for writing and for reading. The precise gap lengths required are determined by the flying height, thickness of the medium utilized, the magnetic properties of the medium, and by the recording mode utilized, i.e., perpendicular or parallel.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A ring-type magnetic recording and reading head having a low reluctance path closed through a high reluctance gap defined by first and second poles in said low reluctance path, said low reluctance path having a high -permeability member therein, comprising:

electrical winding means on said high permeability member adapted for receiving write current for imposing flux across said gap and for manifesting read current caused by flux changes sensed at said gap, and a saturable pole tip adjacent said gap on said first pole, said pole tip, in part, defining said gap and being so dimensioned with respect to said first pole that said pole tip saturates in response to said write current and said first pole does not saturate in response to said write current so as to form, effectively, a wide gap when said head is operating as a recording head and a narrow gap when said 2. The head of claim 1 wherein said pole tip has a first cross-sectional area that results in saturation of said pole tip in response to said write current, and said first pole has a second cross-sectional area that does not result in saturation of said first pole in response to said write current, said second cross-sectional area being larger than said first cross-sectional area, said first pole and pole tip having a stepped cross-section that changes abruptly from said first cross-sectional area to said second cross-sectional area.

3. The head of claim 1 wherein said saturable pole tip has a tapered shape of decreasing cross-sectional area in a direction approaching said gap said so that said saturable pole tip saturates in response to said write current as a result of said decreasing cross-sectional area.

4. The head of claim 1, further comprising a slider body of magnetic material forming part of said low reluctance path and having an aerodynamic bearing surface, and a thin film of high-permeability material deposited on said bearing surface, said thin film defining said gap.

a portion of said thin film adjacent said gap defining said saturable pole tip.

5. The head of claim 1 wherein said pole tip and said first pole comprise the same magnetic material.

6. The head of claim 1 wherein said gap has a leading edge and a trailing edge with respect to relative velocity between said head and a magnetic medium, said first pole defining said leading edge of said gap.

7. The head of claim 6 wherein said saturable pole tip on said first pole has a first cross-sectional area, and said second pole has a second cross-sectional area facing said gap and defining said trailing edge of said gap, said second cross-sectional area being larger than said first cross-sectional area.

* * * * *